H. D. KINTNER.
GATE.
APPLICATION FILED MAY 16, 1911.
1,009,152.
Patented Nov. 21, 1911.
2 SHEETS—SHEET 1.
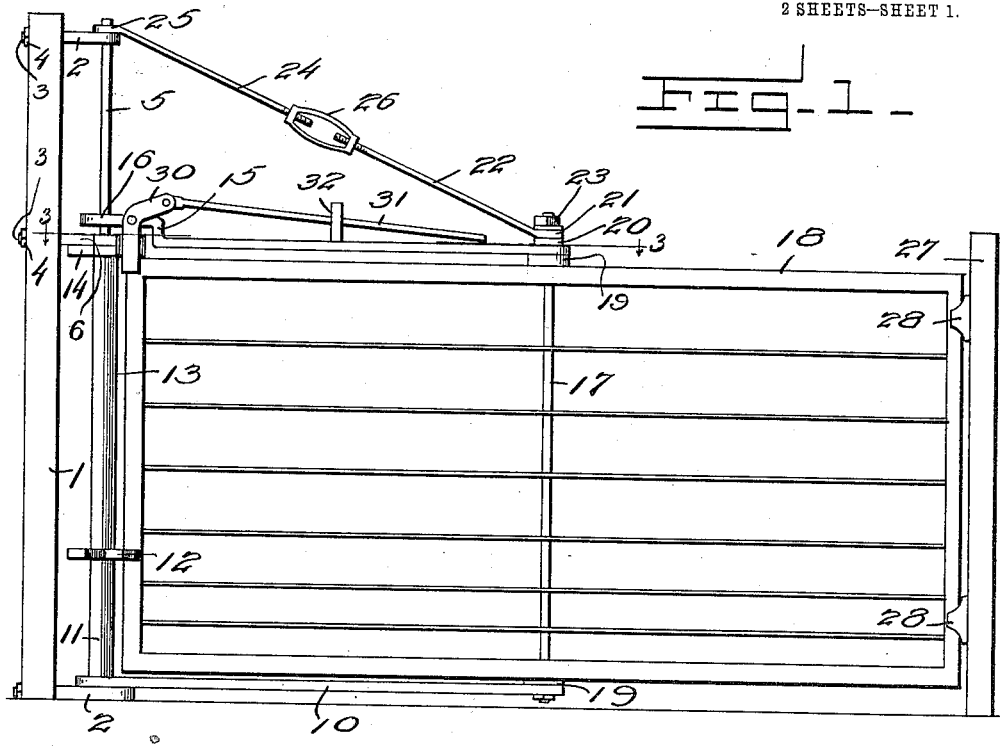
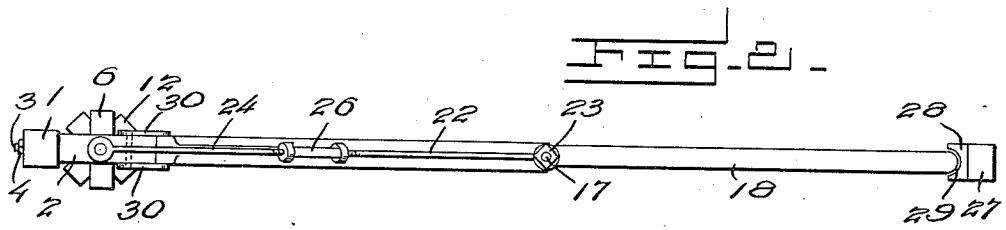
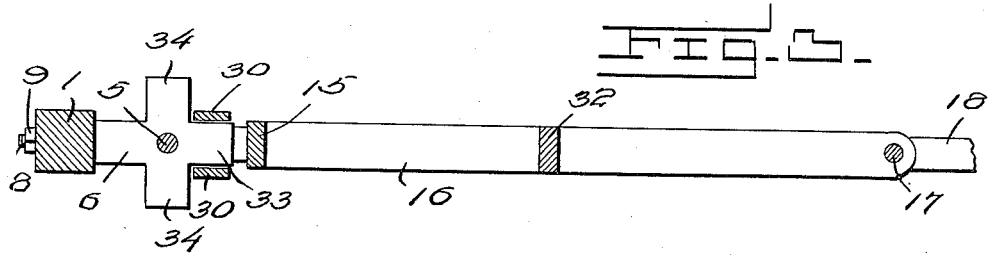
Witnesses
Inventor
H. D. Kintner,
By Harry Ellis Chandlee
Attorney

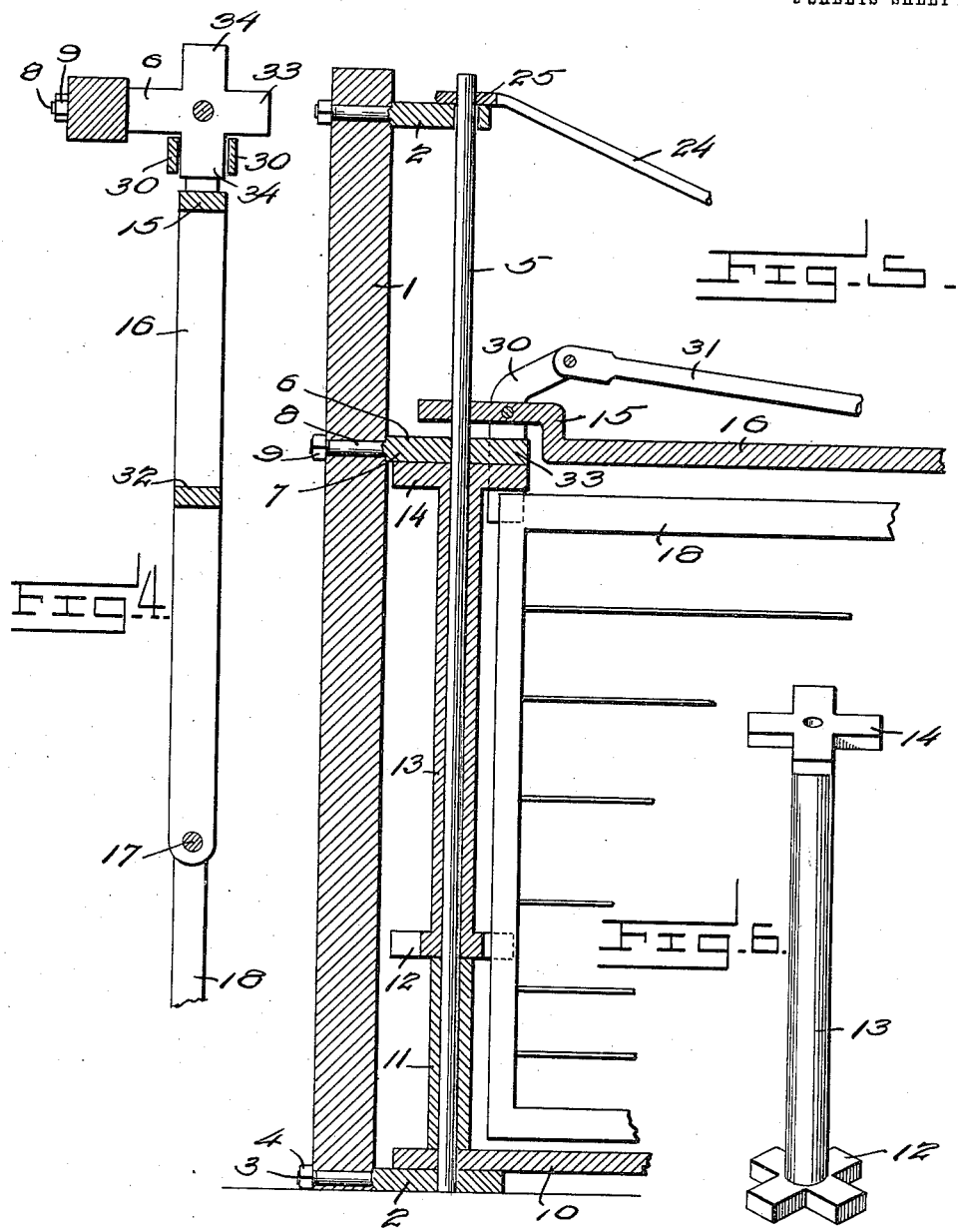

UNITED STATES PATENT OFFICE.

HENRY D. KINTNER, OF BRYAN, OHIO.

GATE.

1,009,152.   Specification of Letters Patent.   Patented Nov. 21, 1911.

Application filed May 16, 1911. Serial No. 627,452.

*To all whom it may concern:*

Be it known that I, HENRY D. KINTNER, a citizen of the United States, residing at Bryan, in the county of Williams and State of Ohio, have invented certain new and useful Improvements in Gates, of which the following is a specification.

My invention relates to improvements in gates, and has for its leading object the provision of an improved form of centrally pivoted gate which can be securely locked in either open or closed position.

Another object of the invention is the provision of an improved device for supporting and locking a gate having double pivotal supports.

A further object of the invention is the provision of an improved gate having hinged brackets pivotally secured to the central portion of the gate which gate has stationary keepers fixedly secured to the gate posts which will absolutely prevent swinging of the gate on its pivot or of the brackets on their hinges until the gate is unlocked.

Other objects and advantages of my improved gate will be apparent from the following description taken in connection with the drawings, and it will be understood that I may make any modifications in construction within the scope of my claims without departing from or exceeding the spirit of the invention.

Figure 1 represents a side elevation of my gate in locked position. Fig. 2 represents a top plan view thereof with parts removed. Fig. 3 represents a cross sectional view on the line 3—3 of Fig. 1 illustrating the gate in locked position. Fig. 4 represents a similar sectional view on line 3—3 showing the parts in unlocked and open position. Fig. 5 represents a vertical sectional view of the supporting post and part carried thereby, and Fig. 6 represents a perspective view of the rotating sleeve and cruciform plate carried thereby for locking the gate in position.

In the drawings, the numeral 1 designates the main gate post, having projecting therefrom at the top and bottom the brackets 2 having formed thereon the threaded lugs 3 which project through the post and have the nuts 4 engaged on their projecting ends to clamp the brackets to the post. Secured to said brackets is the vertical spindle 5 which is centrally braced by the cruciform shaped bracket 6 having the spindle passing centrally therethrough and having one of its arms 7 provided with the lug 8 which extends through the post and has the nut 9 engaged on its projecting end.

Rotatably mounted on the lower end of the spindle is the supporting plate 10 while resting upon said plate 10 is the elongated spacing collar 11 upon which rests the cruciform plate 12 secured to the lower end of the cylindrical sleeve 13 which is rotatably mounted on the spindle and bears the cruciform plate 14 on its upper end, said plate 14 resting against the under face of the cruciform bracket 6. Engaged on the spindle above said bracket 6 is the offset portion 15 of the plate 16 which extends in alinement with the cruciform bracket 6 and is of the same length as the plate 10, the outer ends of the plates 10 and 16 being connected by the pivot spindle 17.

Mounted upon the spindle 17 is the frame 18 of my gate, the spindle passing through the center of the longitudinal bars of the gate and pivotally supporting the gate, washers 19 being interposed between the gate and the said plates, while resting on the plate 16 are a plurality of washers 20, the eye 21 of the threaded rod 22 being engaged on the spindle 17 above said washers and being secured in place by the nut 23. A similarly shaped rod 24 has an eye 25 mounted on the upper end of the spindle 5, a turn buckle 26 connecting said rods 24 and 22, and the adjustment of the turn buckle raising and lowering the spindle and thus the gate pivotally mounted thereon.

To limit the pivotal movement of the gate on the spindle 17, I provide the second gate post 27 with a plurality of keeper plates 28 each having a central groove 29 formed therein.

When it is desired to lock my gate in closed position, I swing the plates 10 and 16 on the spindle 5 until they are in alinement with the two posts and as I swing them into said position I bring the outer ends of my gate into engagement with the keeper plates 28, the end of the gate fitting into said groove. I then swing the gate into alinement with the two posts, the inner edge of the gate frame engaging between two adjacent arms of the cruciform plate 12 and the upper edge of the gate just swinging below the cruciform plate 14. By reference to the drawings it will be seen that the cruciform plate 12 is so disposed that its arms bisect the spaces between the arms of the cruciform plate 14 said arms thus making angles of 45° with each other, and one of the arms of the plate 14 being in alinement with the bracket 6 when the gate is in closed position.

Pivotally secured to the offset 15 of the plate 16 is the locking member 30 which spans the gate and plate 16 and has pivotally secured thereto the operating rod 31 which extends forward through the guide bracket 32 carried by the plate 16. When the gate is in locked position, the member 30 is swung downward on its pivot, and spans the forward arm 33 of the cruciform bracket 6, the forwardly extending arm of the cruciform plate 14 and the rear of the gate, whereby the plate 16, cruciform plate 14, and the end of the gate are all secured by the locking member 30 in alinement with the arm 33 of the plate 6 which is fixedly secured to the supporting post 1, and movement of any of these parts is consequently absolutely prevented. To release the parts and allow of the movement thereof it is merely necessary to press rearwardly on the operating lever 31 which swings the member 30 upward into inoperative position when the gate may be swung on its pivot spindle 17 or the plates supporting the gate may be swung on their pivot spindle 5.

When it is desired to lock the gate in open position the operation is exactly the same except that the various members are secured by the locking member 30 to one of the laterally extending arms 34 of the supporting bracket plate 6 instead of being secured to its forwardly extending arm 33.

From the foregoing description taken in connection with the drawings, the construction and operation of my gate will be readily understood, and it will be seen that I have provided a thoroughly efficient and satisfactory gate having a pivot support for its brackets, which brackets are provided with a pivot spindle passing centrally through the gate thus providing a double pivotal movement for the gate, and it will be further observed that I have provided an improved efficient locking means for securing a gate in either open or closed position, which means serve to simultaneously lock the gate against movement on either its central pivot or on the pivot of its supporting members.

I claim:

1. The combination with a supporting post, of brackets projecting therefrom, a vertical spindle supported by the brackets, a cruciform bracket secured to the post and having the spindle passing centrally therethrough, a sleeve rotatably mounted upon the spindle and having a cruciform plate secured to each end, said plates being arranged with their arms at angles of 45° to each other, gate supporting brackets pivotally mounted on the spindle, a pivot rod carried by said gate supports, a gate pivotally mounted on said rod, a turn-buckle device connecting the rod and spindle, and a locking device carried by one of the gate supports and having depending arms for simultaneously spanning the end of the gate and one of the arms of the cruciform bracket and one of the cruciform plates to lock said parts together, the arms of the other cruciform plate receiving the end of the gate therebetween.

2. The combination with a supporting post, of a plurality of brackets secured thereto, one of said brackets being of cruciform shape, a spindle secured to the brackets, a gate pivotally supported by said spindle, and a locking member carried by the gate and adapted to span the portion of the gate and one of the arms of the cruciform bracket to lock the gate to said arm and prevent pivotal movement of the gate.

3. The combination with a supporting post, of a vertical spindle secured thereto, a cruciform plate carried by the post, a gate pivotally supported by the spindle, a sleeve mounted on the spindle and having a plate at one end with arms spanning the gate and a plate at the other end with an arm in alinement with the gate, and a locking member carried by the gate to span one arm of the cruciform plate of the post and the alined arm of the sleeve plate and gate to lock the parts together to prevent their pivotal movement.

In testimony whereof I affix my signature, in the presence of two witnesses.

HENRY D. KINTNER.

Witnesses:
ElIZABETH KINTNER,
C. L. NEWCOMER.

---

Copies of this patent may be obtained for five cents each, by addressing the "Commissioner of Patents, Washington, D. C."